(No Model.)

P. MEDART.
BELT PULLEY.

No. 458,635. Patented Sept. 1, 1891.

ATTEST:
B. W. Miller
J. B. Farquhar

INVENTOR:
Philip Medart,
by Baldwin Davidson & Wight
Attorneys

United States Patent Office.

PHILIP MEDART, OF ST. LOUIS, MISSOURI, ASSIGNOR OF ONE-HALF TO WILLIAM MEDART, OF SAME PLACE.

BELT-PULLEY.

SPECIFICATION forming part of Letters Patent No. 458,635, dated September 1, 1891.

Application filed April 24, 1891. Serial No. 390,300. (No model.)

*To all whom it may concern:*

Be it known that I, PHILIP MEDART, a citizen of the United States, residing at St. Louis, State of Missouri, have invented certain new and useful Improvements in Belt-Pulleys, of which the following is a specification.

My invention relates to that class of belt-pulleys in which the cast-iron spider has its hub divided and which is provided with clamping-bolts for securing it to a shaft.

In carrying out my invention I make the rim and spider separable and form the spider with a hub which is split or divided, so that it may be tightly clamped on its shaft in any desired position. The hub is formed with lugs or flanges on opposite sides of the lateral opening, and bolts are employed on opposite sides of the spider for connecting the flanges and tightly clamping the hub to the shaft. The spider-arms are formed of cast metal integrally with the hub and the rim of wrought metal riveted to the headed ends of the spider-arms. The rim is formed of one piece of wrought metal, the abutting ends being secured to a spider-arm out of line with the lateral opening in the hub. Where the rim is cast integrally with the spider, there is danger of its breaking when the pulley is clamped on its shaft; but where a wrought-iron rim is used, as in my pulley, there is no such danger. By forming the spider of a single piece of cast metal and the rim of a single piece of wrought metal secured permanently to the spider a simplicity of construction is afforded, which is very desirable.

Figure 1:
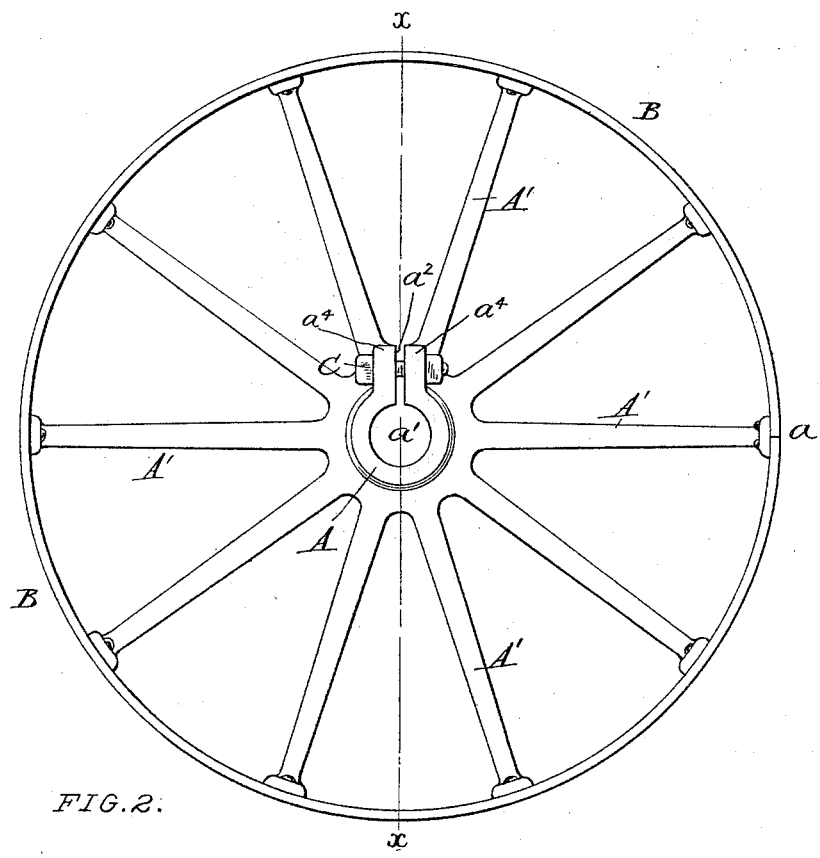
Figure 2:
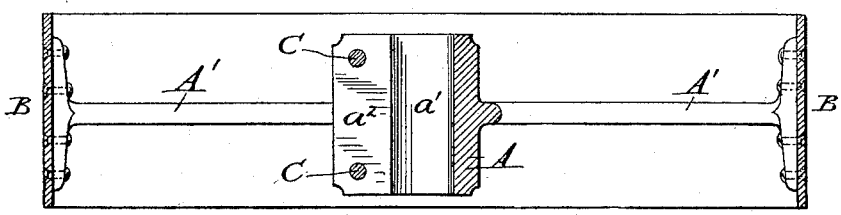

In the accompanying drawings, Figure 1 represents a side elevation of my improved pulley, and Fig. 2 a central cross-section therethrough on the line $x\ x$ of Fig. 1.

A spider is shown as consisting of a hub A and arms A', all cast in one piece. The hub is provided with a shaft-opening $a'$, and projects on both sides of the spider, and with parallel longitudinal flanges $a^4$, separated by a radial slit $a^3$, extending through both the hub and flanges. These flanges are united by transverse clamping-bolts C near their ends and on each side of the spider. A rim B is shown as formed of a single piece of wrought-iron riveted to the flanged or headed ends of the spider-arms. The abutting ends of the rim are secured to the same spider-arm, as indicated at $a$, Fig. 1. I thus provide a very strong and simple pulley, which may be readily removed or replaced and firmly secured upon its shaft by loosening or tightening the clamp-bolts.

One advantage incident to my improved organization is that I am enabled to use an undivided rim, the required movement of the clamping-flanges being very slight and the wrought-iron rim possessing sufficient elasticity to accommodate this movement without appreciable or undue distortion of the rim or spider.

Having thus fully described the construction, organization, and operation of my improved belt-pulley, what I claim therein as new and as of my own invention is—

The belt-pulley herein described, consisting of the combination of the cast-metal hub having a shaft-opening approximating in size the shaft to which the pulley is secured, the spider-arms cast in one piece with the hub, flanges on the hub on opposite sides of the longitudinal slit dividing it, clamping-bolts uniting these flanges on opposite sides of the arms, and the wrought-iron rim formed of a single piece of metal secured directly to the ends of the spider-arms, the organization being such that the hub is adapted to be clamped directly upon its shaft without unduly straining or distorting the rim of the spider, as herein set forth.

In testimony whereof I have hereunto subscribed my name.

PHILIP MEDART.

Witnesses:
B. W. MILLER,
T. B. FARQUHAR.